US007371171B1

(12) United States Patent
Englman et al.

(10) Patent No.: US 7,371,171 B1
(45) Date of Patent: May 13, 2008

(54) WAGERING GAME WITH SECONDARY SYMBOL

(75) Inventors: Allon Englman, Chicago, IL (US); Dion K. Aoki, Henderson, NV (US)

(73) Assignee: WMS Gaming Inc., Chicago, IL (US)

(*) Notice: Subject to any disclaimer, the term of this patent is extended or adjusted under 35 U.S.C. 154(b) by 143 days.

(21) Appl. No.: 10/910,833

(22) Filed: Aug. 4, 2004

(51) Int. Cl.
*G07F 17/34* (2006.01)
*A63F 13/00* (2006.01)

(52) U.S. Cl. ............................ 463/20; 463/25; 463/31; 273/143 R; 273/138.2

(58) Field of Classification Search ............ 463/16-20, 463/12, 13, 25, 31; 273/143 R, 138.2
See application file for complete search history.

(56) References Cited

U.S. PATENT DOCUMENTS

| | | | | |
|---|---|---|---|---|
| 4,721,307 A | | 1/1988 | Okada | |
| 4,826,169 A | | 5/1989 | Bessho et al. | |
| 5,152,529 A | | 10/1992 | Okada et al. | |
| 5,393,057 A | * | 2/1995 | Marnell, II | 463/13 |
| 5,393,061 A | | 2/1995 | Manship et al. | |
| 5,395,111 A | | 3/1995 | Inoue et al. | |
| 5,423,539 A | | 6/1995 | Nagao et al. | |
| 5,697,843 A | | 12/1997 | Manship et al. | |
| 5,722,891 A | * | 3/1998 | Inoue | 463/20 |
| 5,752,881 A | | 5/1998 | Inoue et al. | |
| 5,839,957 A | | 11/1998 | Schneider et al. | |
| 6,056,642 A | | 5/2000 | Bennett et al. | |
| 6,315,663 B1 | | 11/2001 | Sakamoto | |
| 6,322,078 B1 | | 11/2001 | Adams | |
| 6,336,860 B1 | | 1/2002 | Webb et al. | |
| 6,375,189 B1 | | 4/2002 | Jones | |
| 6,394,902 B1 | | 5/2002 | Glavich et al. | |
| 6,402,150 B1 | | 6/2002 | Jones | |
| 6,471,588 B2 | | 10/2002 | Sakamoto | |
| 6,494,454 B2 | | 12/2002 | Adams | |
| 6,520,855 B2 | | 2/2003 | DeMar et al. | |
| 6,616,142 B2 | | 9/2003 | Adams | |
| 6,676,512 B2 | | 1/2004 | Fong et al. | |
| 6,726,204 B2 | | 4/2004 | Inoue et al. | |
| 6,729,620 B2 | | 5/2004 | Jones | |
| 6,780,109 B2 | | 8/2004 | Kaminkow | 463/20 |
| 6,790,140 B1 | | 9/2004 | Niwa et al. | |
| 6,824,466 B1 | | 11/2004 | Hirota et al. | |
| 6,848,993 B2 | | 2/2005 | Webb et al. | |
| 6,880,826 B2 | | 4/2005 | Inoue et al. | |
| 6,905,408 B2 | | 6/2005 | Inoue et al. | |
| 6,923,441 B2 | | 8/2005 | Inoue et al. | |
| 6,988,731 B2 | | 1/2006 | Inoue et al. | |
| 7,014,559 B1 | | 3/2006 | Fong et al. | |
| 2003/0060267 A1 | | 3/2003 | Glavich et al. | 463/20 |

* cited by examiner

*Primary Examiner*—Benjamin H Layno
(74) *Attorney, Agent, or Firm*—Nixon Peabody LLP

(57) ABSTRACT

Wagering game terminal and method of operating same are disclosed that increases the excitement and entertainment value over existing gaming terminals. The wagering game terminal includes a wagering game that has a set of primary symbols and one or more secondary symbols. During the wagering game, one of the secondary symbols is superimposed on one or more of the primary symbols. These primary symbols may then be given enhanced evaluation in the wagering game, depending on certain conditions being met in the wagering game, or some other predetermined event.

33 Claims, 9 Drawing Sheets

WAGERING GAME WITH SECONDARY SYMBOL

FIELD OF THE INVENTION

The present invention relates generally to wagering games and, more particularly, to a wagering game terminal and method of operating same where secondary symbols are used to enhance the primary symbols.

BACKGROUND OF THE INVENTION

Wagering game terminals, such as slot machines, video poker machines, and the like, have been a cornerstone of the gaming industry for several years. The popularity of such wagering game terminals among players generally depends on the perceived likelihood of winning money at the terminal and the intrinsic entertainment value of the terminal relative to other available gaming options. Where the available gaming options include a number of competing terminals and the expectation of winning each terminal is roughly the same (or believed to be the same), players are likely to be attracted to the more entertaining and exciting of the terminals. Consequently, wagering game terminal operators strive to employ the most entertaining and exciting terminals available because such terminals attract frequent play and, hence, increase profitability for the operators. Thus, in the highly competitive wagering game terminal industry, there is a continuing need to develop new types of games, or improvements to existing games, that will enhance the entertainment value and excitement associated with the games.

One concept that has been successfully employed in existing wagering game terminals to enhance player entertainment is the use of progressive games. In the gaming industry, a "progressive" game involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

Another concept that has been employed is that of a secondary or "bonus" game which may be played in conjunction with a "basic" game. The bonus game may include any type of game, either similar to or entirely different from the basic game, and is typically initiated by the occurrence of certain pre-selected events or outcomes of the basic game. Examples of the types of bonus games may include adventure games, guessing games, games of chance, and the like. Such a bonus game has been found to produce a significantly higher level of player excitement than the basic game alone because it provides an additional chance to play, which increases the player's overall expectation of winning.

Whether in a basic game or a bonus game, most existing wagering games have a set of symbols that are displayed in various combinations to indicate the outcome of the game. For example, slot machines have symbols on the reels, card games have symbols on the cards, and so forth. Each symbol usually stands on its own and is evaluated separately from the other symbols. Thus, the evaluation of a "7" symbol on a reel of a slot machine, for example, does not typically depend on the "Cherry" symbol, and so on. In some slot machines, certain special symbols such as "wildcard" symbols may assume multiple values or meanings based the neighboring symbols. However, even a "wildcard" symbol stands alone in that its function as a wildcard does not depend on some other symbol. Such an arrangement is rigid and limits the number and types of wagering games that may be developed, potentially depriving players of more exciting and enjoyable wagering games.

Accordingly, what is needed is a wagering game that is not constrained to individual, stand-alone symbols. More specifically, what is needed is a wagering game where multiple symbols may be evaluated in conjunction with one another.

SUMMARY OF THE INVENTION

The present invention is directed to a wagering game terminal and method for operating same that increases the excitement and entertainment value of the game over existing wagering game terminals. The wagering game terminal includes a wagering game that has a set of primary symbols and one or more secondary symbols. During the wagering game, one of the secondary symbols is superimposed on one or more of the primary symbols. These primary symbols may then be given enhanced evaluation in the wagering game, depending on certain conditions being met in the wagering game, or some other predetermined event.

In general, in one aspect, the invention is directed to a wagering game terminal. The wagering game terminal comprises a wager input for accepting a wager for a wagering game from a player at the wagering game terminal, and a display for displaying a symbol combination indicative of a randomly selected outcome of the wagering game. The outcome includes a set of primary symbols and a secondary symbol displayed on one or more of the primary symbols. Primary symbols that have a secondary symbol displayed thereon are evaluated in an enhanced manner upon occurrence of a predetermined event.

In general, in another aspect, the invention is directed to a method of conducting a wagering game on a wagering game terminal. The method comprises the steps of accepting a wager from a player at the wagering game terminal and displaying a symbol combination representing a randomly selected outcome of the wagering game on the wagering game terminal. The symbol combination includes primary symbols and a secondary symbol, the secondary symbol superimposed on one or more of the primary symbols. The method further comprises the step of evaluating the one or more primary symbols that have the secondary symbol superimposed thereon in an enhanced manner upon occurrence of a predetermined event.

In general, in yet another aspect, the invention is directed to another wagering game terminal. The wagering game terminal comprises a wager input for accepting a wager for a wagering game from a player at the wagering game terminal, and a display for displaying a symbol combination indicative of a randomly selected outcome of the wagering game. The symbol combination includes primary symbols and secondary symbols, one or more of the primary symbols having one of the secondary symbols displayed thereon. A game of chance on the wagering game terminal may then be used to generate a randomly selected result from a predefined set of results to determine whether the primary symbols that have one of the secondary symbols displayed thereon are evaluated in an enhanced manner.

In general, in yet another aspect, the invention is directed to another method of conducting a wagering game on a wagering game terminal. The method comprises the steps of accepting a wager for a wagering game from a player at the wagering game terminal, and displaying a symbol combination representing a randomly selected outcome of the wagering game on the wagering game terminal. The symbol combination includes primary symbols, a secondary symbol, and a trigger symbol. The method further comprises the steps of marking one or more of the primary symbols with the secondary symbol to indicate potential enhanced evaluation, and evaluating the one or more primary symbols that have been marked with the secondary symbol in an enhanced manner if the trigger symbol appears at a predetermined location in the symbol combination.

In general, in still another aspect, the invention is directed to another wagering game terminal. The wagering game terminal comprises a wager input for accepting a wager for a wagering game from a player at the wagering game terminal, and a display for displaying a symbol combination indicative of a randomly selected outcome of the wagering game. The symbol combination includes primary symbols and a secondary symbol, one or more of the primary symbols having the secondary symbol displayed thereon. A third party feature on the wagering game terminal is then used to determine whether to evaluate the primary symbols that have the secondary symbol displayed thereon in an enhanced manner.

The above summary of the present invention is not intended to represent each embodiment or every aspect of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
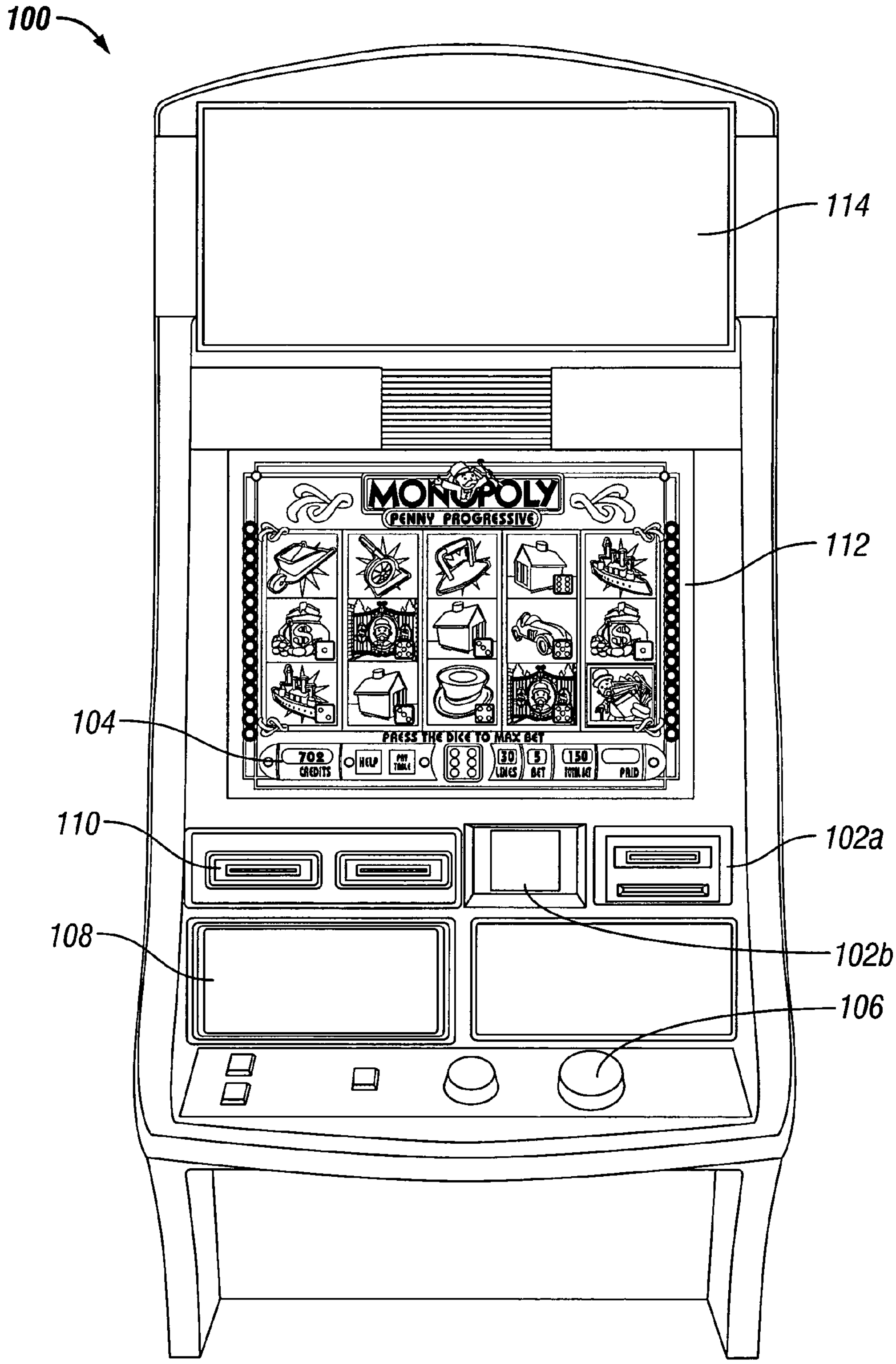
FIG. 1 illustrates a wagering game terminal according to one embodiment of the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

As mentioned above, embodiments of the invention provide a wagering game terminal and method for operating same where one or more primary symbols in the wagering game may be marked or tagged with a secondary symbol. The secondary symbol may be displayed on the primary symbols, preferably in some place that is conspicuous, but that does not significantly interfere with the player's view of the primary symbols. The particular primary symbols that receive a secondary symbol may be randomly selected during the game. Depending on certain criteria being met in the wagering game, or some other predetermined event, the evaluation of these primary symbols may be enhanced. For example, the enhanced evaluation may be granted upon occurrence of a trigger symbol in the wagering game. The trigger symbol may or may not match or correspond to the secondary symbol. The predetermined event may be a separate game of chance that is independent of the wagering game. It is also possible to display multiple secondary symbols on one primary symbol, with each secondary symbol providing a different enhancement to the primary symbol.

FIG. 1 shows a perspective view of an exemplary wagering game terminal 100 according to embodiments of the invention. The wagering game terminal 100 may be operated as a stand-alone terminal, or it may be connected to a network of wagering game terminals. Further, the wagering game terminal 100 may be any type of wagering game terminal and may have varying structures and methods of operation. For example, the wagering game terminal 100 may be a mechanical wagering game terminal configured to play mechanical slots, or it may be an electromechanical or electrical wagering game terminal configured to play a video casino game, such as blackjack, slots, keno, poker, etc. In the example shown, the wagering game terminal 100 is a video slot machine.

As shown, the wagering game terminal 100 includes input devices, such as a wager acceptor 102 (shown as a card wager acceptor 102*a* and a cash wager accepter 102*b*), a touch screen 104, a push-button panel 106, a payout mechanism 108, and an information reader 110. The wagering game terminal 100 further includes a main display 112 for displaying information about the basic wagering game and, in some embodiments, a secondary display 114 for displaying a pay table and/or game-related information or other entertainment features. While these typical components found in the wagering game terminal 100 are described briefly below, it should be understood that numerous other elements may exist and may be used in any number of combinations to create variation of the wagering game terminal 100.

The wager acceptors 102*a* and 102*b* may be provided in many forms, individually or in combination. For example, the cash wager acceptor 102*a* may include a coin slot acceptor or a note acceptor to input value to the wagering game terminal 100. The card wager acceptor 102*b* may include a card-reading device for reading a card that has a recorded monetary value with which it is associated. The card wager acceptor 102*b* may also receive a card that authorizes access to a central account that can transfer money to the wagering game terminal 100.

The payout mechanism 108 performs the reverse function of the wager acceptors 102*a* and 102*b*. For example, the payout mechanism 108 may include a coin dispenser or a note dispenser to dispense money or tokens from the wagering game terminal 100. The payout mechanism 108 may also be adapted to receive a card that authorizes the wagering game terminal 100 to transfer credits from the wagering game terminal 100 to a central account.

The push button panel 106 is typically offered, in addition to the touch screen 104, to provide players with an option on making their game selections. Alternatively, the push button panel 106 may facilitate player input needed for certain aspects of operating the game, while the touch screen 104 facilitates player input needed for other aspects of operating the game.

The outcome of the basic wagering game is displayed to the player on the main display 112. The main display 112 may take a variety of forms, including a cathode ray tube (CRT), a high resolution LCD, a plasma display, LED, or any other type of video display suitable for use in the wagering game terminal 100. As shown here, the main display 112 also includes the touch screen 104 overlaying the entire display (or a portion thereof) to allow players to make game-related selections. Alternatively, the wagering game terminal 100 may include a number of mechanical reels that display the game outcome.

In some embodiments, the information reader 110 is a card reader that allows for identification of a player by reading a card with information indicating the player's identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 110, which allows the casino's computers to register that player's wagering at the wagering game terminal 100. Then, the wagering game terminal 100 may use the secondary display 114 for providing the player with information about his or her account or other player-specific information. Also, in some embodiments, the information reader 110 may be used to restore assets that the player achieved during a previous gaming session and had saved.

Figure 2:
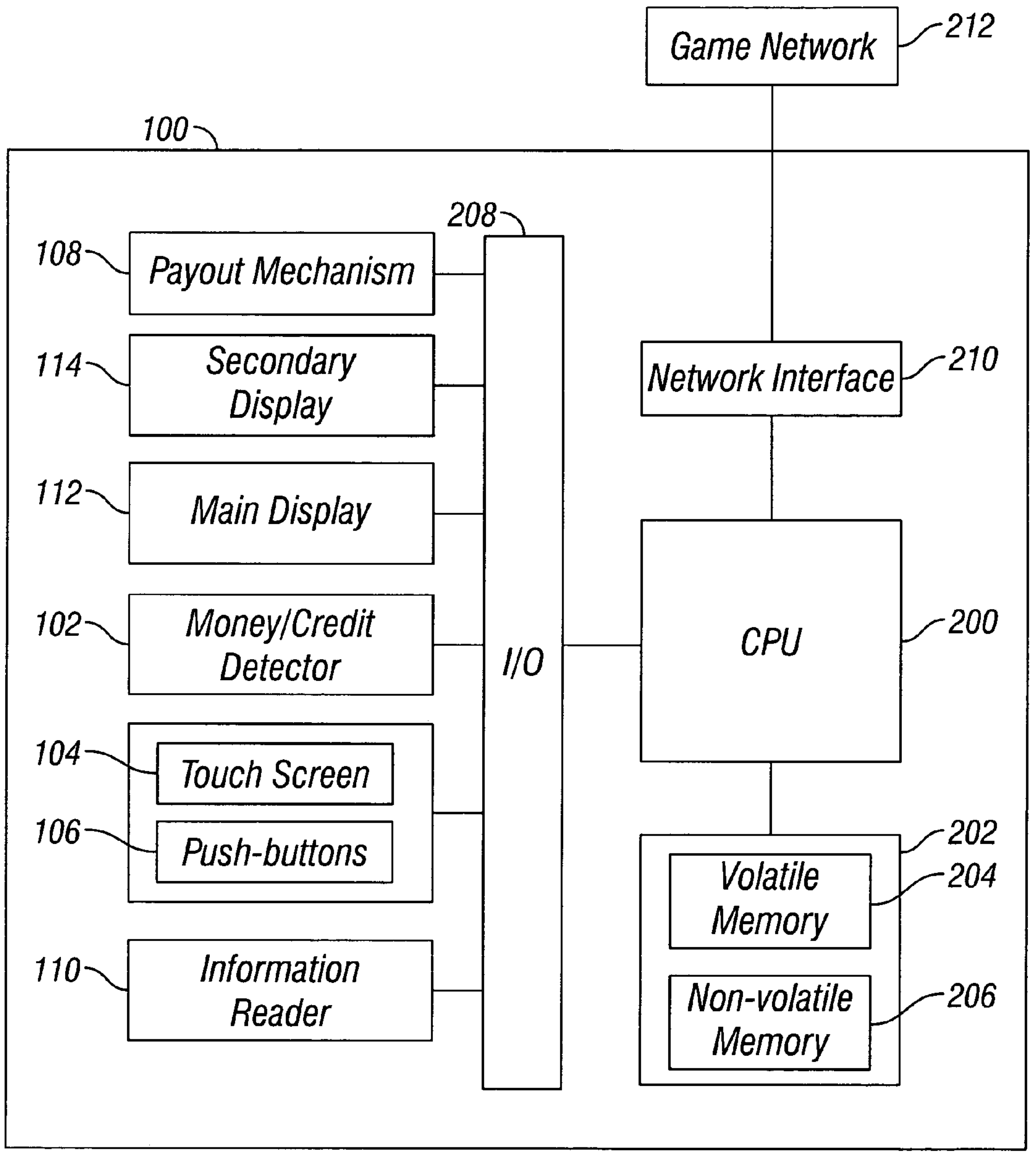
FIG. 2 illustrates the wagering game terminal of FIG. 1 in more detail.

As shown in FIG. 2, the various components of the wagering game terminal 100 are controlled by a central processing unit (CPU) 200, such as one or more microprocessors or microcontrollers. To provide the gaming functions, the CPU 200 executes a game program that generates a randomly selected game outcome. The CPU 200 is also coupled to or includes a local memory 202. The local memory 202 may be in the form of one or more volatile memories 204 (e.g., a random-access memory (RAM)) and one or more non-volatile memories 206 (e.g., an EEPROM).

Communication between the peripheral components of the wagering game terminal 100 and the CPU 200 is controlled by the CPU 200 through input/output (I/O) circuits 208. The CPU 200 also communicates with external systems via a network interface unit 210. Although the I/O circuit 208 and network interface unit 210 are shown here as individual components, it should be appreciated that both of these units may include a number of different types of components.

The network interface unit 210 connects the wagering game terminal 100 to a network 212 that includes several wagering game terminals. The wagering game terminals on the network 212 may be the same wagering terminal or they may be different wagering terminals. That is, they may have the same basic and bonus game or they may have different basic and bonus games. In some embodiments, the wagering game network 212 may control one or more functions of the wagering game terminal 100. In such embodiments, the wagering game terminal 100 may be a simple input/output terminal with regard to the functions provided by the wagering game network 212. For example, the random selection of outcomes for the basic game and the bonus game may be functions performed on the wagering game network 212 and subsequently provided to the wagering game terminal 100. Functions that are not provided by the wagering game network 212, such as control of the local lights, sounds, and the images on the display 112 of the wagering game terminal 100, are handled by the local CPU 200.

Figure 3A:
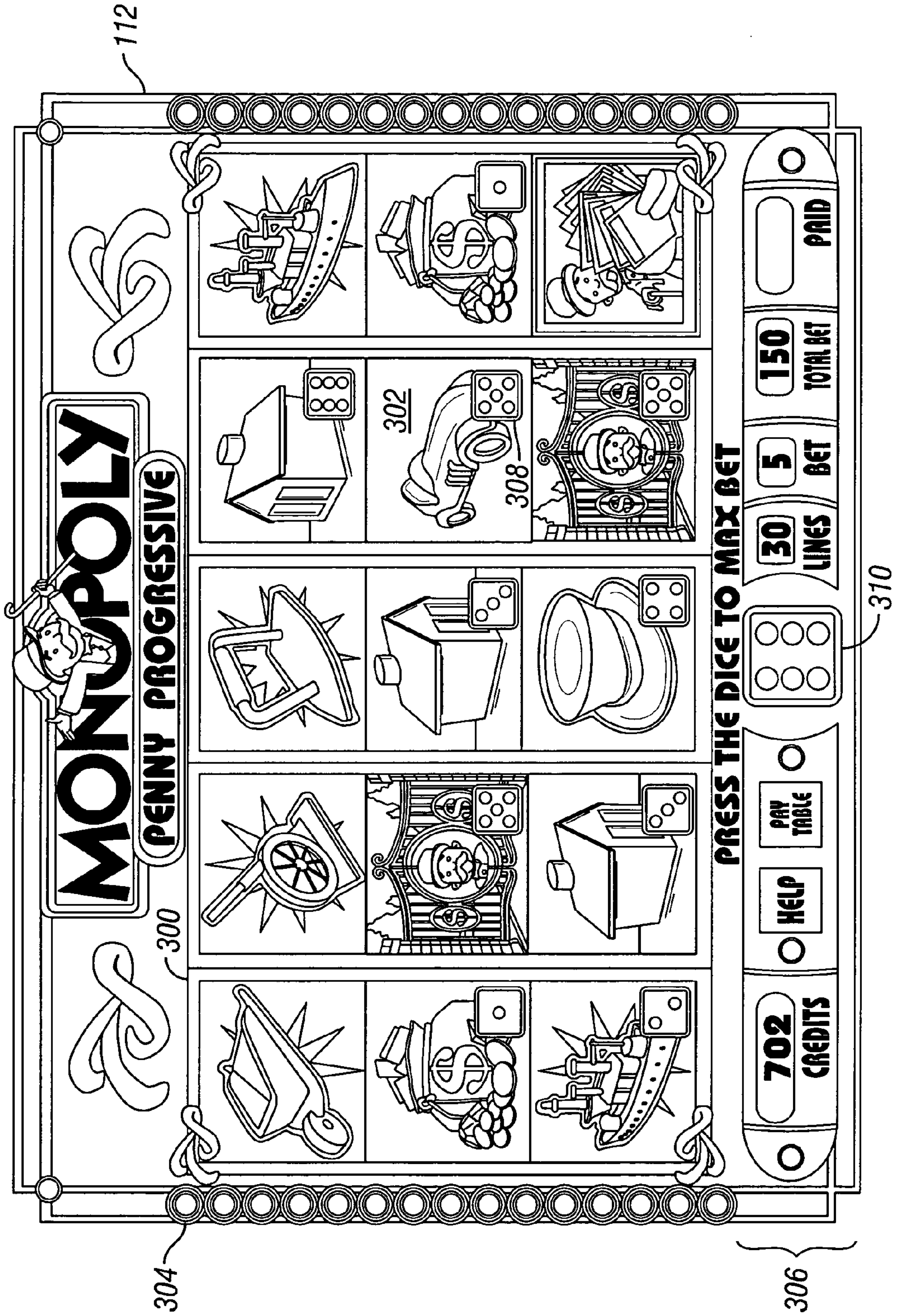
FIGS. 3A-3B illustrate an exemplary wagering game having primary and secondary symbols that may be played on the wagering game terminal of FIG. 1.
Figure 3B:
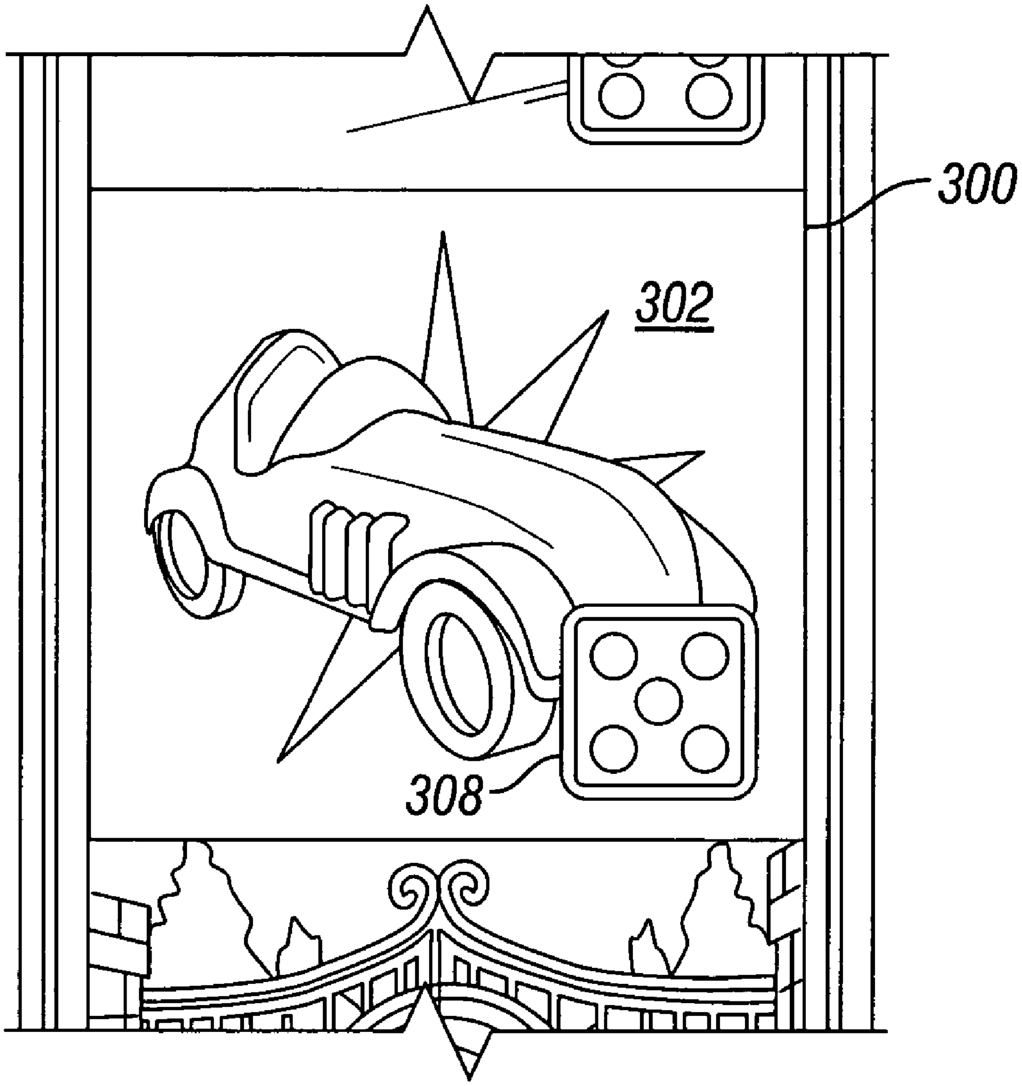

FIGS. 3A-3B illustrate an exemplary implementation of a wagering game that may be displayed on the main display 112 of the wagering game terminal 100. The wagering game may be a basic game or a bonus game and may have several reels 300 for generating a randomly selected outcome. Each reel 300 includes a plurality of primary symbols 302 that are rendered according to some theme, such as the Monopoly game theme in the example shown here. A winning outcome occurs when the primary symbols 302 line up in one or more predetermined paylines (e.g., three matching symbols in a row). There are thirty possible paylines in this example, as indicated by the payline indicators 304. An information area 306 displays various items of information about the wagering game, such as the current credit balance, number of lines being played, wager per line, total wager, and the amount paid, if any.

In accordance with embodiments of the invention, the wagering game further includes one or more secondary symbols 308 that may be superimposed on the primary symbols 302. The presence of a secondary symbol 308 on a primary symbol 302 may cause the wagering game terminal 100 to evaluate that primary symbol 302 in an enhanced manner. For example, the secondary symbol 308 may cause the wagering game terminal 100 to treat the primary symbol 302 as a wildcard instead of its regular value/meaning. Alternatively (or in addition), the wagering game terminal 100 may evaluate the primary symbol 302 as a "Double" symbol that increases the payout of any winning paylines containing that primary symbol 302. Other types of enhanced evaluations known to those having ordinary skill in the art are also available. In some embodiments, several enhanced evaluations represented by multiple different secondary symbols 308 may be available in a single round of the wagering game. It is also possibly for the enhanced evaluation to be performed by the network 212 and then provided to the wagering game terminal 100.

FIG. 3B illustrates a close-up view of an exemplary primary symbol 302 having a secondary symbol 308 superimposed thereon. As can be seen, the artwork of the secondary symbol 308 may follow the same theme as the primary symbol 302, or it may be entirely unrelated. In the example shown, the secondary symbol 308 takes the form of a die in keeping with the Monopoly game theme, with each die having the same or a different die face. The selection of which particular die face is displayed may be made at random by the wagering game terminal 100 (or by the network 212). Preferably, the size of each secondary symbol 308 is small compared to the primary symbols 302 so as not to interfere with the player's view of the primary symbols 302.

Pairing of the secondary symbols 308 with the primary symbols 302 may also be done at random by the wagering game terminal 100 (or the network 212). That is, during the wagering game, the wagering game terminal 100 (or the network 212) randomly decides which primary symbols 302 are paired with what secondary symbols 308, the number of pairs, and so on. A "third party" feature (discussed below) may then be used to determine the enhancement (if any) of the primary symbols 302 based on the presence of the secondary symbols 308. It is also possible, of course, to superimpose a secondary symbol 308 on every primary symbol 302, or to combine more than one secondary symbol 308 on one primary symbol 302. Then, the "third party" feature may be used to determine which primary symbols 302 are given what enhanced evaluations.

The "third party" feature may be any event having a randomly selected outcome, such as flipping of a coin or picking of a card, and other similar games of chance. The outcome of the "third party" feature may be independent of the wagering game, or the two events may be linked somehow. The "third party" feature may be activated manually, or it may be activated automatically, for example, by betting over a certain minimum amount. In the example of FIGS. 3A-3B, the "third party" feature is implemented as a touch screen die 310 that may be activated by pressing the image of the die 310. The die 310 may also be tied to other features in the wagering game, such as maxing out the player's wager or selecting all of the paylines.

When the die 310 is activated, the display 112 of the wagering game terminal 100 shows a simulation of a rolling die, with different die faces appearing in rapid succession until the die 310 eventually lands on one of the die faces. The result of the rolling may be completely independent of the outcome of the wagering game, or the two events may be linked. Thereafter, the die face on the die 310 is checked against the primary symbols 302 in the wagering game outcome. Any primary symbol 302 having a secondary symbol 308 that matches the die face of the die 310 will be given enhanced evaluation.

Figure 4:
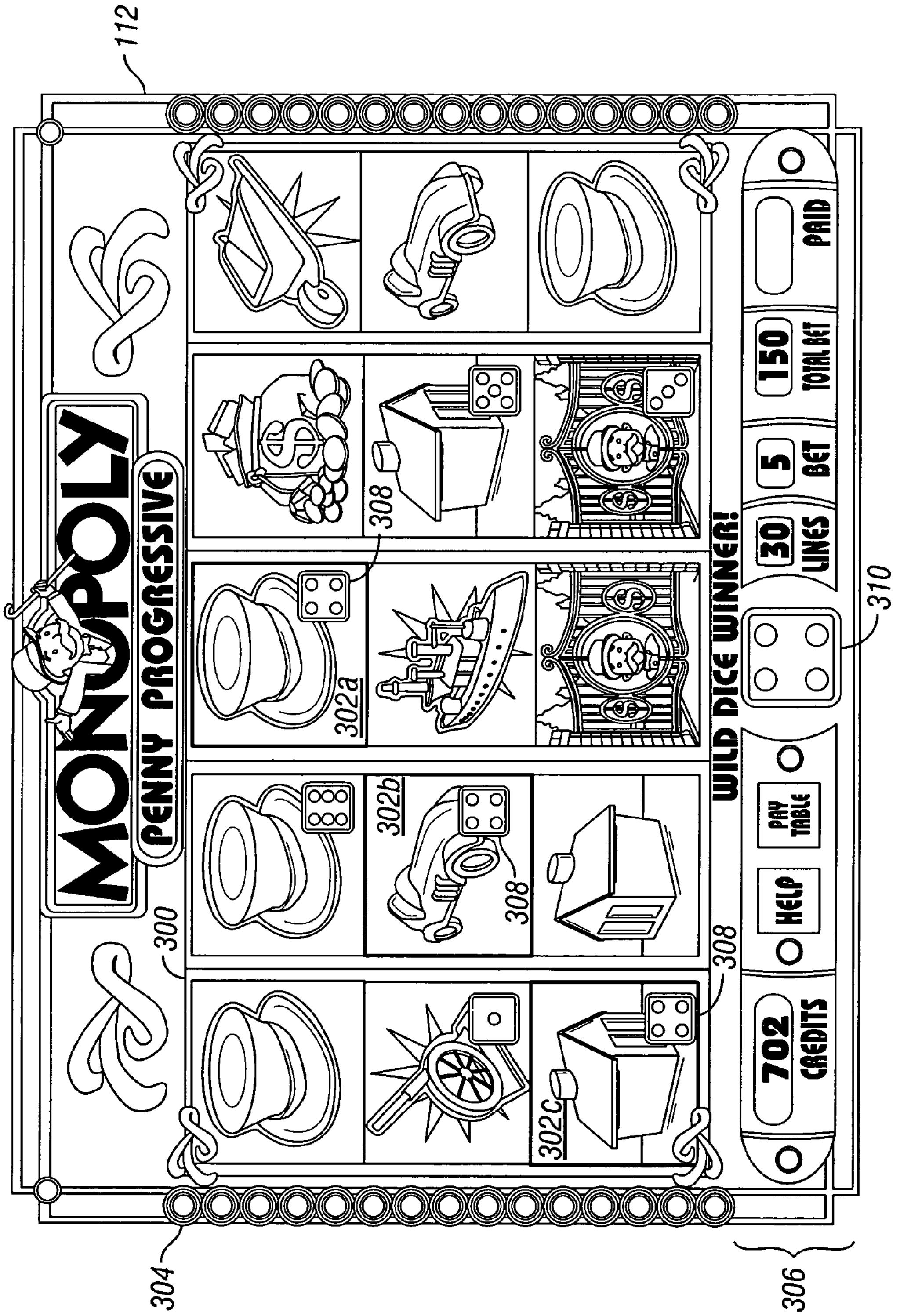
FIG. 4 illustrates an exemplary outcome that may trigger enhancement of the primary symbols based on the secondary symbols according to one embodiment of the invention.
Figure 5:
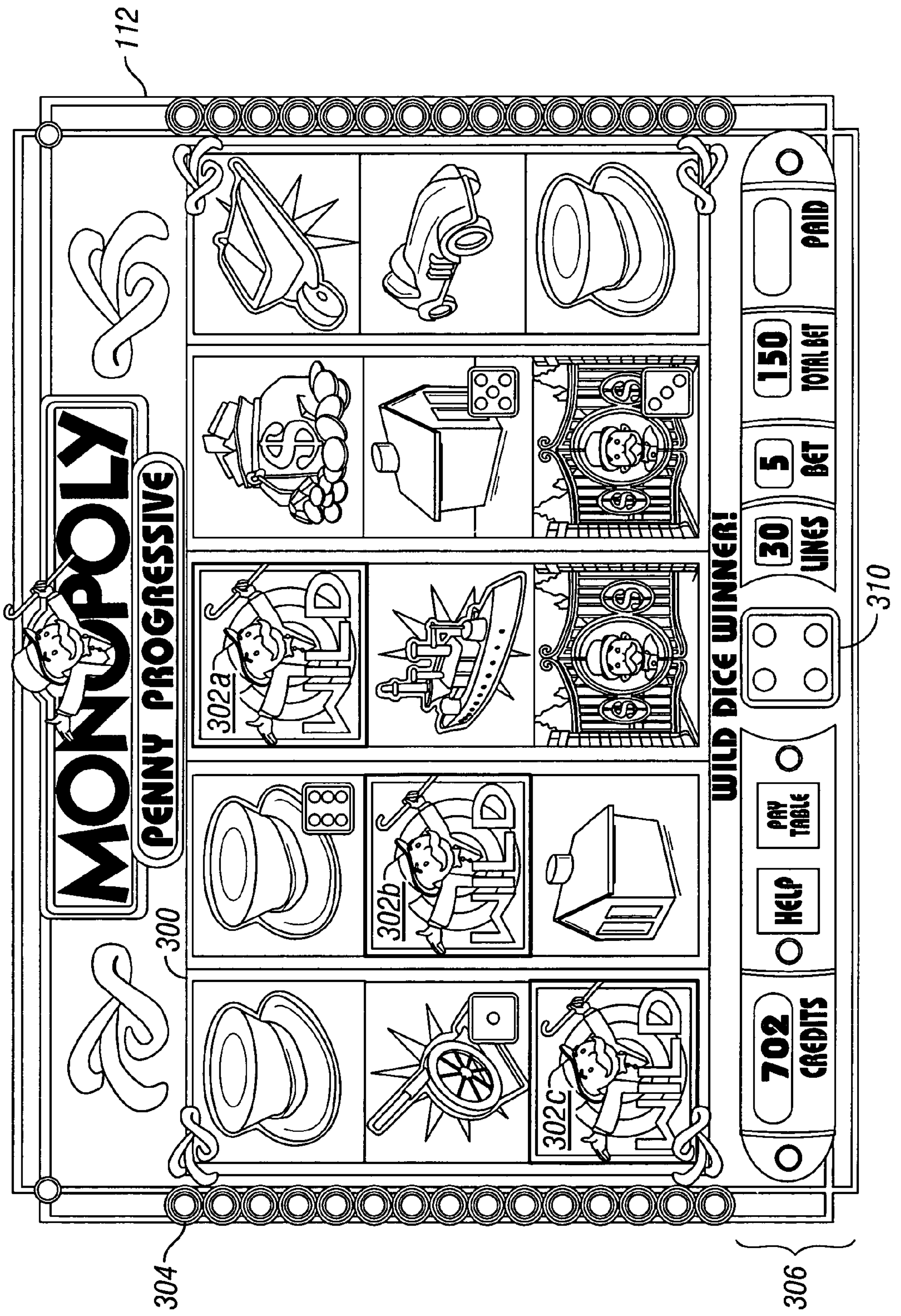
FIG. 5 illustrates an exemplary implementation of the primary symbols being transmogrified based on the enhancements according to one embodiment of the invention.

The foregoing is illustrated in FIG. 4, where the die 310 has stopped on the number four die face. Accordingly, any primary symbol 302 having a number four secondary symbol 308 superimposed thereon will be given enhanced evaluation. As it happens, the combination of symbols resulting from the wagering game shown here has produced three primary symbols 302*a*, 302*b*, and 302*c* that have a number four secondary symbol 308. Thus, these three primary symbols 302*a*, 302*b*, and 302*c* will be given enhanced evaluation. In the present embodiment, the enhanced evaluation means treating all primary symbols 302 that have matching secondary symbols 308 as wildcards. All other primary symbols 302 are given their normal treatment, including those with non-matching secondary symbols 308. This is illustrated in FIG. 5, where primary symbols 302*a*, 302*b*, and 302*c* have been transmogrified into wildcard symbols, while the other primary symbols 302 remain unchanged. It is, of course, not necessary to change the appearance of a symbol when giving enhanced treatment to that symbol.

Figure 6:
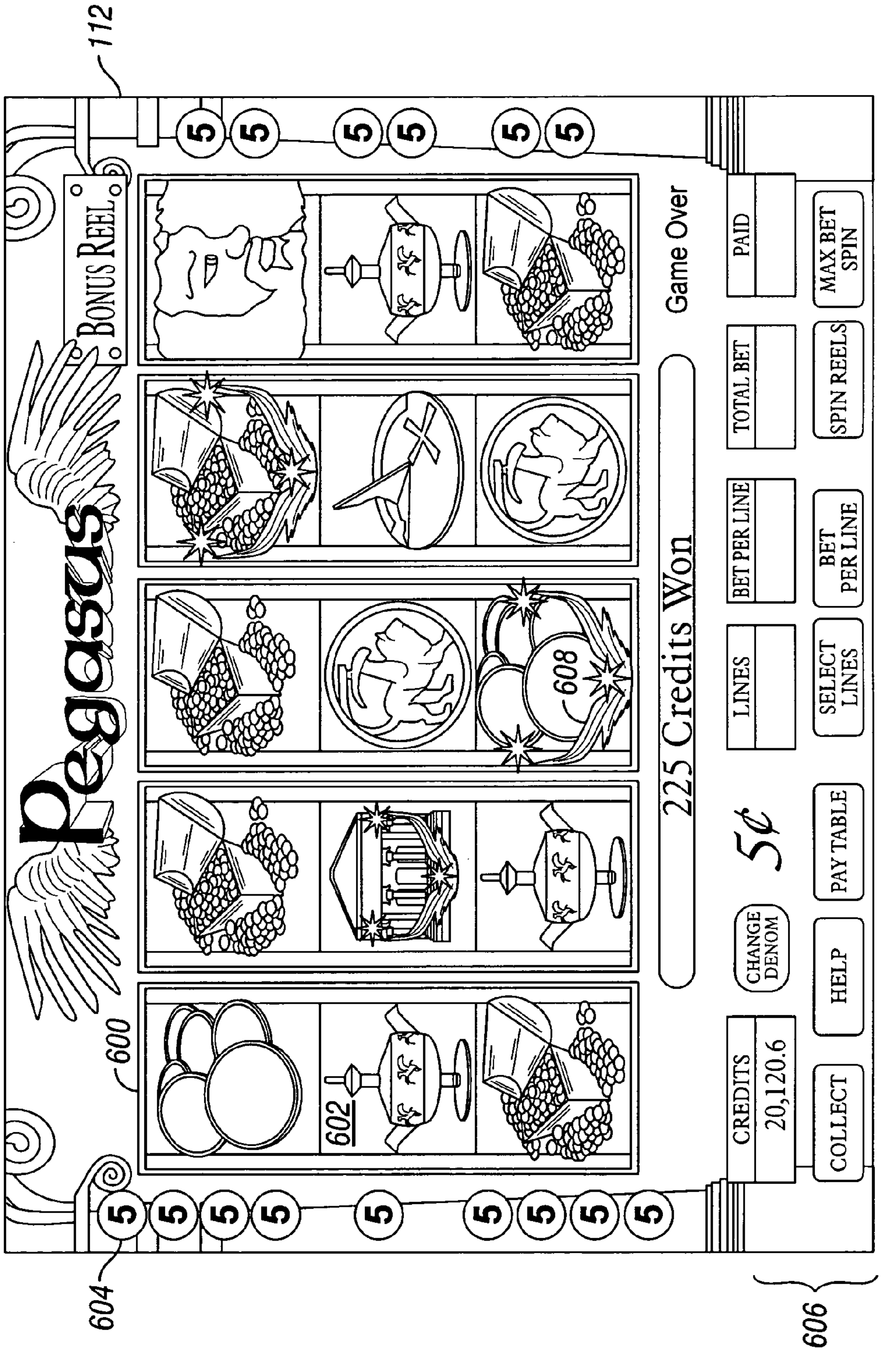
FIG. 6 illustrates another exemplary wagering game having primary and secondary symbols according to one embodiment of the invention.

FIG. 6 illustrates another exemplary implementation of a wagering game that may be displayed on the main display 112 of the wagering game terminal 100. The wagering game of FIG. 6, like the one in the previous figures, has several reels 600 that each include a plurality of primary symbols 602. The primary symbols 602 here are drawn after Greek mythology elements instead of Monopoly game pieces. Payline indicators 604 indicate the available paylines, and an information area 606 displays various items of information about the wagering game. A secondary symbol 608, the wings of Pegasus in this example, is combined with one or more randomly selected primary symbols 602. Although there is only one secondary symbol 608 shown here, more than one secondary symbol 608 may certainly be used. In accordance with embodiments of the invention, the primary symbols 602 that have been marked with a secondary symbol 608 may be given enhanced treatment, depending on the result of the "third party" feature.

The "third party" feature in the wagering game of FIG. 6, unlike the one in the previous figures, is actually a part of the wagering game. In one implementation, the "third party" feature involves one of the primary symbols 602 being designated as a trigger symbol 700 (see FIG. 7). When the trigger symbol 700 appears in the symbol combination resulting from the wagering game, any primary symbol 602 marked with a secondary symbol 608 is given enhanced evaluation. The enhanced evaluation may be triggered by any simple appearance of the trigger symbol 700, or it may be triggered only if the trigger symbol 700 appears in a certain place, for example, a preselected reel 600, or a specific position within that reel 600, and so forth.

Figure 7:
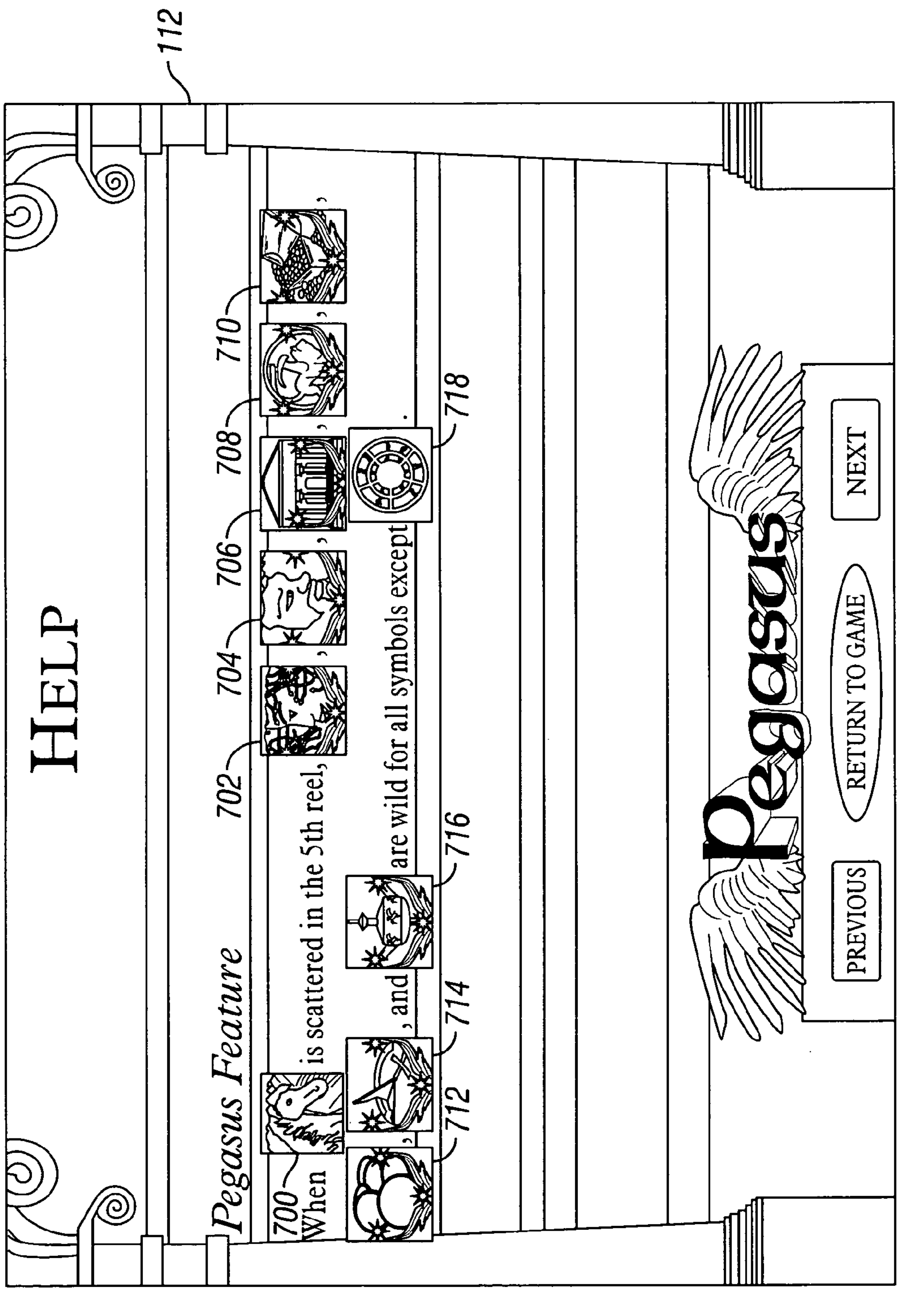
FIG. 7 illustrates an exemplary help screen that may be used to explain the wagering game of FIG. 6.

The above is illustrated by an exemplary "Help" screen that may be used with the wagering game, shown in FIG. 7. The screen explains that enhanced evaluation is triggered when the trigger symbol 700 (Pegasus, in this embodiment) appears anywhere in the fifth reel. In some embodiments, the enhanced evaluation may apply to all primary symbols 602 marked with a secondary symbol 608, or it may apply only to a certain set of primary symbols 602, for example, the ones indicated at 702, 704, 706, 708, 710, 712, 714, and 716. Moreover, the effect of the enhanced evaluation may apply to all primary symbols 602, or it may apply only to a limited set of the primary symbols 602. In the example shown here, the enhanced evaluation results in the marked primary symbols 702-716 being treated as wildcards for all primary symbols 602 except the symbol indicated at 718. For that primary symbol 718, the marked primary symbols 702-716 are given their normal treatment.

The trigger symbol 700 itself may also be given enhanced treatment, or it be treated just like any other primary symbol 602. It is also possible to use more than one trigger symbol 700 per round of the wagering game. Each trigger symbol 700 may have the same or a different corresponding secondary symbol 608, resulting in the same or a different enhanced evaluation. Alternatively, a single trigger symbol 700 may be used for all rounds of the wagering game, but the trigger symbol 700 may change with each round. Of course, the trigger symbol 700 may also be entirely omitted so that the presence of a secondary symbol 608 on any primary symbol 602 alone is enough to warrant that primary symbol being given enhanced treatment.

Figure 8:
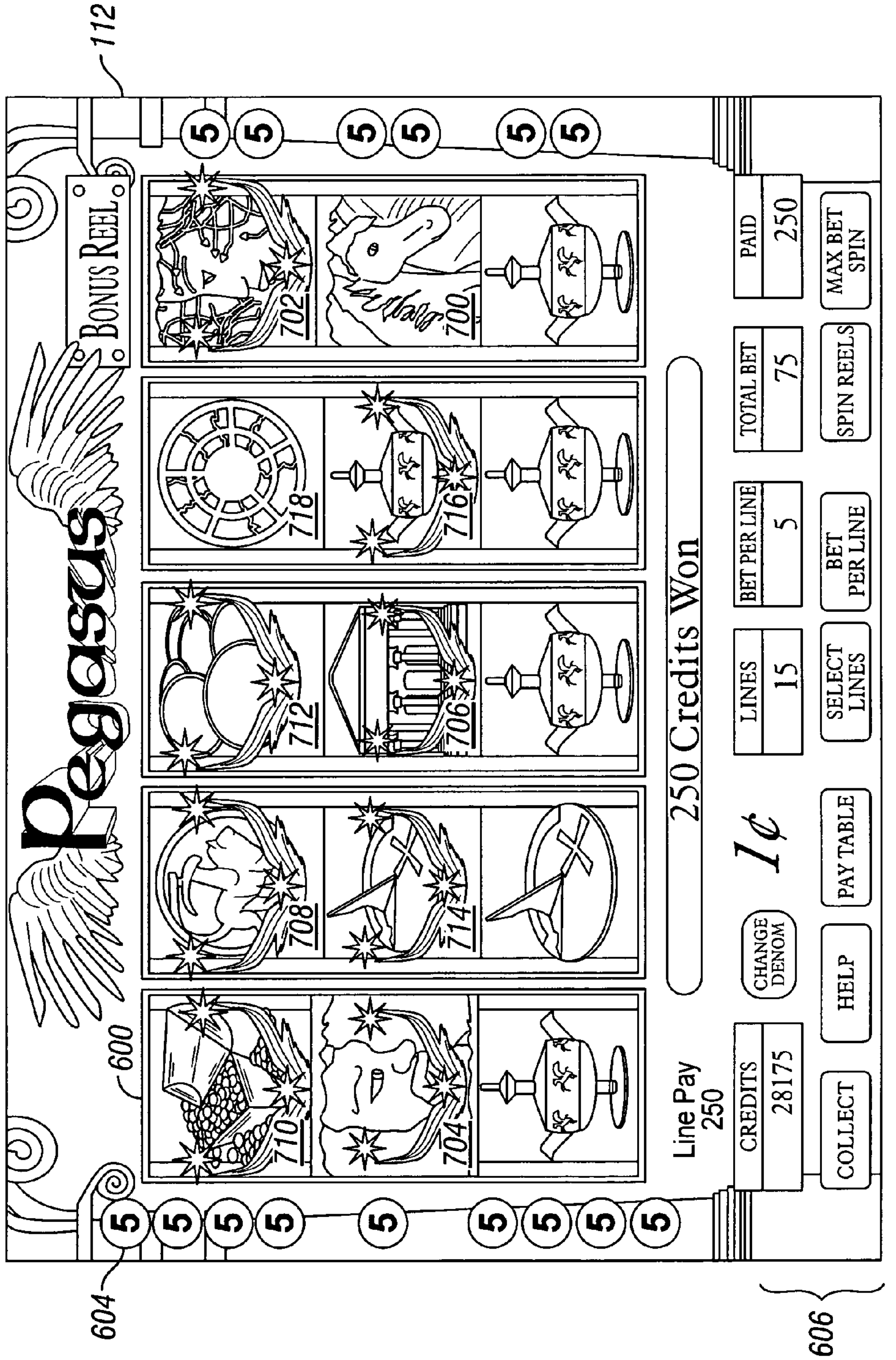
FIG. 8 illustrates another exemplary outcome that may trigger enhancement of the primary symbols based on the secondary symbols according to one embodiment of the invention.

FIG. 8 illustrates an exemplary symbol combination resulting from the wagering game according to the preceding embodiments of the invention. As can be seen, the wagering game has produced the trigger symbol 700 in the fifth reel, labeled the "Bonus Reel." Thus, a secondary symbol 608 (see FIG. 6) superimposed on any one of the primary symbols 702-716 enumerated in FIG. 7 causes those primary symbols 702-716 to be treated as wildcards. Since the top row contains four of these primary symbols 702-716, that row would normally constitute a winning payline. However, because these primary symbols 702-716 are not treated as wildcards for the symbol indicated at 718, the top row is not a winning payline in this embodiment. The second row, on the other hand, may constitute a winning payline if the trigger symbol 700 itself is treated as a wildcard.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A wagering game system, comprising:

a wager input device configured to accept a wager for a wagering game from a player at said wagering game terminal;

a display configured to display a symbol combination indicative of a randomly selected outcome of said wagering game in an arrangement of a plurality of symbol positions, each symbol position including a primary symbol and at least one symbol position including both a primary symbol and a secondary symbol displayed on a respective primary symbol in a manner such that both said secondary symbol and said primary symbol are visible to said player; and a controller configured to award an award in the wagering game responsive to said displayed symbol combination;

wherein primary symbols that have said secondary symbol displayed thereon are evaluated in an enhanced manner upon occurrence of a predetermined event.

2. The wagering game system according to claim 1, wherein said controller is configured to evaluate said primary symbols that have said secondary symbol displayed thereon in an enhanced manner.

3. The wagering game system according to claim 1, wherein said wagering game system comprises a network configured to evaluate said primary symbols that have said secondary symbol displayed thereon in an enhanced manner.

4. The wagering game system according to claim 1, wherein said enhanced manner includes evaluating said primary symbols that have said secondary symbol displayed thereon as wildcards.

5. The wagering game system according to claim 1, wherein said predetermined event includes occurrence of a certain result in a game of chance during said wagering game.

6. The wagering game system according to claim 5, wherein said certain result in said game of chance is independent of said wagering game.

7. The wagering game system according to claim 5, wherein said certain result in said game of chance includes a symbol that matches said secondary symbol.

8. The wagering game system according to claim 1, wherein said predetermined event includes occurrence of a trigger symbol in said symbol combination of said wagering game.

9. The wagering game system according to claim 8, wherein said predetermined event further includes said trigger symbol appearing anywhere in said display.

10. The wagering game system according to claim 8, wherein said wagering game includes a plurality of reels, said predetermined event further including said trigger symbol appearing only in a preselected reel.

11. The wagering game system according to claim 8, wherein said trigger symbol is also evaluated by in an enhanced manner.

12. The wagering game system according to claim 1, wherein said predetermined event includes occurrence of any primary symbol that has said secondary symbol superimposed thereon.

13. A method of conducting a wagering game on a wagering game terminal, comprising:

accepting a wager from a player at said wagering game terminal;

displaying a symbol combination representing a randomly selected outcome of said wagering game in an arrangement of a plurality of symbol positions on said wagering game terminal, each symbol position including a primary symbol and at least one symbol position including both a primary symbol and a secondary symbol superimposed on a respective primary symbol in a manner such that both said secondary symbol and said primary symbol are visible to said player; and evaluating primary symbols that have said secondary symbol superimposed thereon in an enhanced manner wherein a primary symbol having the secondary symbol displayed thereon is evaluated differently in the wagering game than a same primary symbol not having the secondary symbol displayed thereon upon occurrence of a predetermined event.

14. The method according to claim 13, further comprising randomly selecting at least one primary symbol for superimposing said secondary symbol thereon.

15. The method according to claim 13, further comprising randomly selecting an outcome for said predetermined event.

16. The method according to claim 13, further comprising transmogrifying primary symbols having the secondary symbol displayed thereon to indicate evaluation in said enhanced manner.

17. The method according to claim 13, further comprising allowing said player to manually initiate said predetermined event.

18. The method according to claim 13, further comprising initiating said predetermined event automatically if said wager has exceeded a minimum amount.

19. The method according to claim 13, further comprising restricting evaluation in said enhanced manner to a subset of said primary symbols.

20. A wagering game terminal, comprising:

a wager input for accepting a wager for a wagering game from a player at said wagering game terminal;

a display configured to display a symbol combination indicative of a randomly selected outcome of said wagering game in an arrangement of a plurality of symbol positions, each symbol position including a primary symbol and at least one symbol position including both a primary symbol and a secondary symbol displayed on a respective primary symbol in a manner such that both said secondary symbol and said respective primary symbol are visible to said player;

a game of chance on said wagering game terminal for generating a randomly selected result from a predefined set of results to determine whether said primary symbols that have one of said secondary symbols displayed thereon are evaluated in an enhanced manner; and a controller configured to award an award in the wagering game responsive to said displayed symbol combination.

21. The wagering game according to claim 20, wherein said primary symbols that have one of said secondary symbols displayed thereon are evaluated in an enhanced manner if said one of said secondary symbols matches said randomly selected result from said game of chance.

22. The wagering game according to claim 20, wherein said game of chance is a die game.

23. The wagering game according to claim 20, wherein said game of chance also increases said player's wagers when activated.

24. The wagering game according to claim 20, wherein said secondary symbols are selected from said predefined set of results of said game of chance.

25. A method of conducting a wagering game on a wagering game terminal, comprising:

accepting a wager for a wagering game from a player at said wagering game terminal;

displaying a symbol combination representing a randomly selected outcome of said wagering game in an arrangement of a plurality of symbol positions on said wagering game terminal, each symbol position including at least a primary symbol and at least one symbol position comprising a trigger symbol;

marking one or more of said primary symbols in said arrangement of said plurality of symbol positions with said secondary symbol in a manner such that both said secondary symbol and said one or more primary symbols are visible to said player to indicate potential enhanced evaluation;

evaluating said one or more of said primary symbols that have been marked with said secondary symbol in an enhanced manner if said trigger symbol appears at a predetermined location in said symbol combination; and awarding an award in the wagering game responsive to said displayed symbol combination.

26. The method according to claim 25, wherein said predetermined location includes anywhere in said symbol combination.

27. The method according to claim 25, wherein said predetermined location includes a predefined reel of said wagering game.

28. The method according to claim 25, further comprising changing said trigger symbol before beginning a new round of said wagering game.

29. The method according to claim 25, wherein said wagering game is a basic game.

30. The method according to claim 25, wherein said wagering game is a bonus game.

31. A wagering game terminal, comprising:

a wager input for accepting a wager for a wagering game from a player at said wagering game terminal;

a display configured to display a symbol combination indicative of a randomly selected outcome of said wagering game in an arrangement of a plurality of symbol positions, each symbol position including a primary symbol and one or more of said primary symbols including a secondary symbol displayed thereon in a manner such that both said secondary symbol and said one or more primary symbols are visible to said player;

a third party feature on said wagering game terminal for determining whether to evaluate said primary symbols that have said secondary symbol displayed thereon in an enhanced manner; and a controller configured to award an award in the wagering game responsive to said displayed symbol combination.

32. The wagering game according to claim 31, wherein said wagering game includes a plurality of reels and said third party feature is on said reels.

33. The wagering game according to claim 31, wherein said third party feature is separate from said wagering game.

* * * * *